United States Patent [19]

Umemura et al.

[11] Patent Number: 5,397,445
[45] Date of Patent: Mar. 14, 1995

[54] METHOD FOR PRODUCING AN ACID AND/OR ALKALI METAL HYDROXIDE

[75] Inventors: Kazuo Umemura; Tsutomu Naganuma; Haruhisa Miyake, all of Yokohama, Japan

[73] Assignee: Asahi Glass Company Ltd., Tokyo, Japan

[21] Appl. No.: 183,233

[22] Filed: Jan. 19, 1994

Related U.S. Application Data

[63] Continuation of Ser. No. 943,571, Sep. 11, 1992, abandoned.

[30] Foreign Application Priority Data

Sep. 11, 1991 [JP] Japan .................. 3-259610
Dec. 28, 1991 [JP] Japan .................. 3-359210

[51] Int. Cl.$^6$ ............................ B01D 61/44
[52] U.S. Cl. .................. 204/182.4; 204/182.5; 204/296; 204/301
[58] Field of Search .......... 204/98, 103, 104, 182.4, 204/182.5, 296, 301

[56] References Cited

U.S. PATENT DOCUMENTS

| | | | |
|---|---|---|---|
| 4,626,553 | 12/1986 | Hane et al. | 521/27 |
| 4,670,146 | 6/1987 | Inoue et al. | 210/490 |
| 5,039,382 | 8/1991 | Suzuki et al. | 204/98 |
| 5,045,171 | 9/1991 | MacDonald | 204/296 |

FOREIGN PATENT DOCUMENTS

0096239 12/1983 European Pat. Off. .
0124007 11/1984 European Pat. Off. .
0330772 9/1989 European Pat. Off. .

OTHER PUBLICATIONS

Chemie Ingenieur Technik, vol. 61, No. 5, May 1989, pp. 428–429, Srinivasan Sridhar, "Electrodialyse mit Bipolaren Membranen", & Chemie Ingenieur Technik NS 1758/89, Synopse 1958, pp. 1–29.

Patent Abstracts of Japan, vol. 11, No. 115 (C-415), Apr. 10, 1987, & JP-A-61 259 707, Nov. 18, 1986, Yamamoto Mitsugi, et al., "Separation Membrane for Pervaporation".

*Primary Examiner*—Kathryn Gorgos
*Assistant Examiner*—Arun S. Phasge
*Attorney, Agent, or Firm*—Oblon, Spivak, McClelland, Maier, & Neustadt

[57] ABSTRACT

A method for producing an acid and/or an alkali metal hydroxide, from a neutral salt by electrodialysis employing a bipolar membrane and an anion exchange membrane and/or a cation exchange membrane, wherein as the anion exchange membrane, an anion exchange membrane made of a polymer having repeating units of the formula:

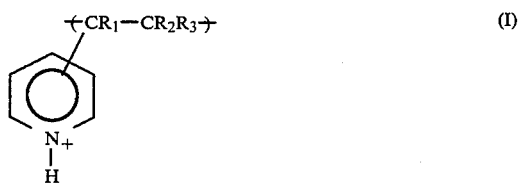

wherein each of $R_1$, $R_2$ and $R_3$ is a hydrogen atom or an alkyl group having up to two carbon atoms, and having an ion-exchange capacity of from 1 to 5 meq/g dry resin, is used.

11 Claims, 2 Drawing Sheets

METHOD FOR PRODUCING AN ACID AND/OR ALKALI METAL HYDROXIDE

This application is a continuation of application Ser. No. 07/943,571, filed on Sep. 11, 1992, now abandoned.

The present invention relates to a method for producing an acid and/or an alkali metal hydroxide at a high concentration with a high current efficiency from a neutral salt by an electrodialytic water splitter employing a bipolar membrane and an anion exchange membrane, and/or a cation exchange membrane.

A so-called bipolar membrane such as a double-layered membrane composed of an anion exchange membrane and a cation exchange membrane, is reported to be capable of splitting water and dissociating it into a hydrogen ion and a hydroxyl ion when an electric current is applied with the bipolar membrane disposed so that the anion exchange membrane is located at the anode side and the cation exchange membrane is located at the cathode side, by Friltte in 1956 (J. Phys. Chem 60, 435). When electrodialysis is conducted as a unit comprising a bipolar membrane (water-splitter) and an anion exchange membrane, and/or a cation exchange membrane, a neutral salt will be decomposed, and an acid and/or an alkali metal hydroxide will readily be formed. Many proposals have been made with respect to such a method for forming an acid and/or an alkali metal hydroxide from a neutral salt.

On the other hand, a method for forming an acid and/or an alkali metal hydroxide by electrodialysis employing the above-mentioned bipolar membrane an anion exchange membrane, and/or a cation exchange membrane, is disclosed in Japanese Examined Patent Publication No. 49842/1981 for the recovery of hydrofluoric acid from a by-product salt formed during the production of a fluorine compound, and in Japanese Examined Patent Publication No. 18669/1988 for the recovery of sulfuric acid and an alkali metal hydroxide from an alkali metal sulfate in a rayon spinning bath. Further, such a method is disclosed in Japanese Examined Patent Publication No. 291608/1988 for the recovery of an acid and an alkali metal hydroxide from an acidic waste solution containing a mineral acid and metal salts.

However, in the recovery of an acid and/or an alkali metal hydroxide by such conventional methods, the current efficiency tends to remarkably drop when the acid concentration exceeds 10% by weight or the alkali metal hydroxide concentration exceeds 20% by weight. Accordingly, such methods are commercially inoperable for the recovery of an acid and/or an alkali metal hydroxide at a high concentration and a high current efficiency. Thus, they had not only a problem from the viewpoint of the efficiency, but also a problem that they cannot be applied at all in some cases.

It is an object of the present invention to eliminate such restriction to the concentration of the resulting acid and/or alkali metal hydroxide, which used to be a drawback in the conventional method for producing an acid and/or an alkali metal hydroxide from a neutral salt employing a bipolar membrane and to provide a method for producing an acid and/or an alkali metal hydroxide at a high concentration from a neutral salt by electrodialysis, whereby the acid and/or the alkali metal hydroxide can be produced or recovered with a high current efficiency.

The present invention provides a method for producing an acid, or an acid and/or an alkali metal hydroxide, from a neutral salt by electrodialysis employing a bipolar membrane and an anion exchange membrane, and/or a cation exchange membrane, wherein the anion exchange membrane comprises a polymer having repeating units of the formula:

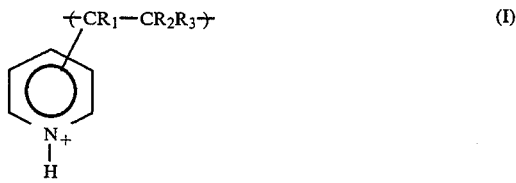

wherein each of $R_1$, $R_2$ and $R_3$ is a hydrogen atom or an alkyl group having up to two carbon atoms, and having an ion-exchange capacity of from 1 to 5 meq/g dry resin.

Now, the present invention will be described in detail with reference to the preferred embodiments.

In the present invention, the cation exchange membrane is preferably a cation exchange membrane having a water content as small as from 3.0 to 8.0% by weight, preferably from 4.0 to 6.0% by weight, in an alkali metal hydroxide aqueous solution having a concentration equal to the concentration of the alkali metal hydroxide to be produced. In the present invention, the water content in the alkali metal hydroxide aqueous solution at a concentration equal to the concentration of the alkali metal hydroxide to be produced, is a value calculated by the following formula:

$$\text{Water content } (\%) = \{(a-b)/b\} \times 100$$

where a is the weight (g) of a cation exchange membrane after it is immersed in an alkali metal hydroxide aqueous solution having such a concentration for 16 hours and then cooled to 25° C., and the alkali metal hydroxide aqueous solution attached to the membrane surface is wiped off, and h is the weight (g) of the same membrane after it is immersed in deionized water at 90° C. for 16 hours and then dried under vacuum at 130° C. for 16 hours.

According to the present invention, an acid having a concentration of from 5 to 25% by weight, particularly from 10 to 20% by weight, and/or an alkali metal hydroxide aqueous solution having a concentration of more than 20% by weight, which used to be difficult to obtain by electrodialysis employing a bipolar membrane and a conventional anion exchange membrane and a cation exchange membrane, can be produced with a high current efficiency as compared with the conventional method. Accordingly, it is thereby possible to recover an acid and/or an alkali metal hydroxide efficiently from various waste liquids containing neutral salts, which used to be difficult to conduct on an industrial scale from the viewpoint of costs, and the method of the present invention is very useful also from the view point of prevention of pollution and effective utilization of resources.

Figure 1:
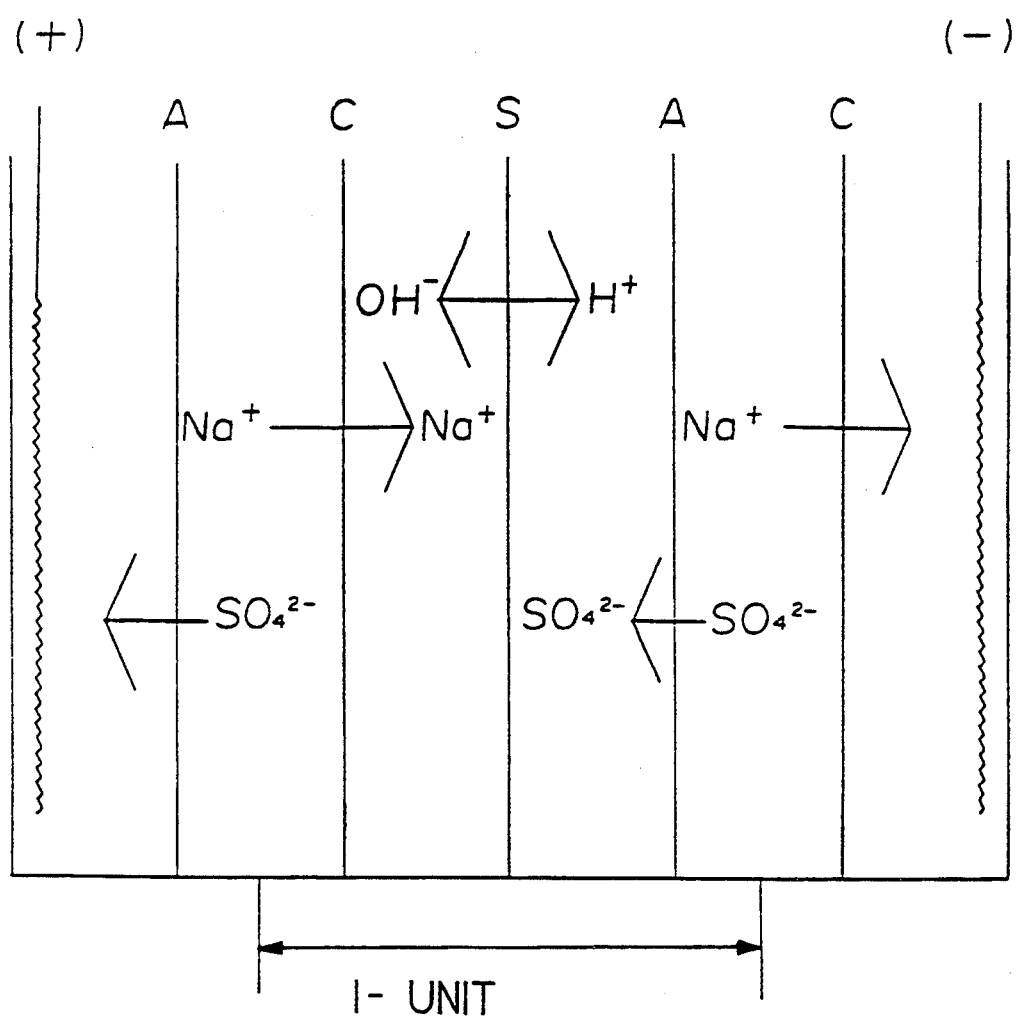
FIG. 1 is a schematic view illustrating a preferred electrodialysis cell to be used for carrying out the method of the present invention.
Figure 2:
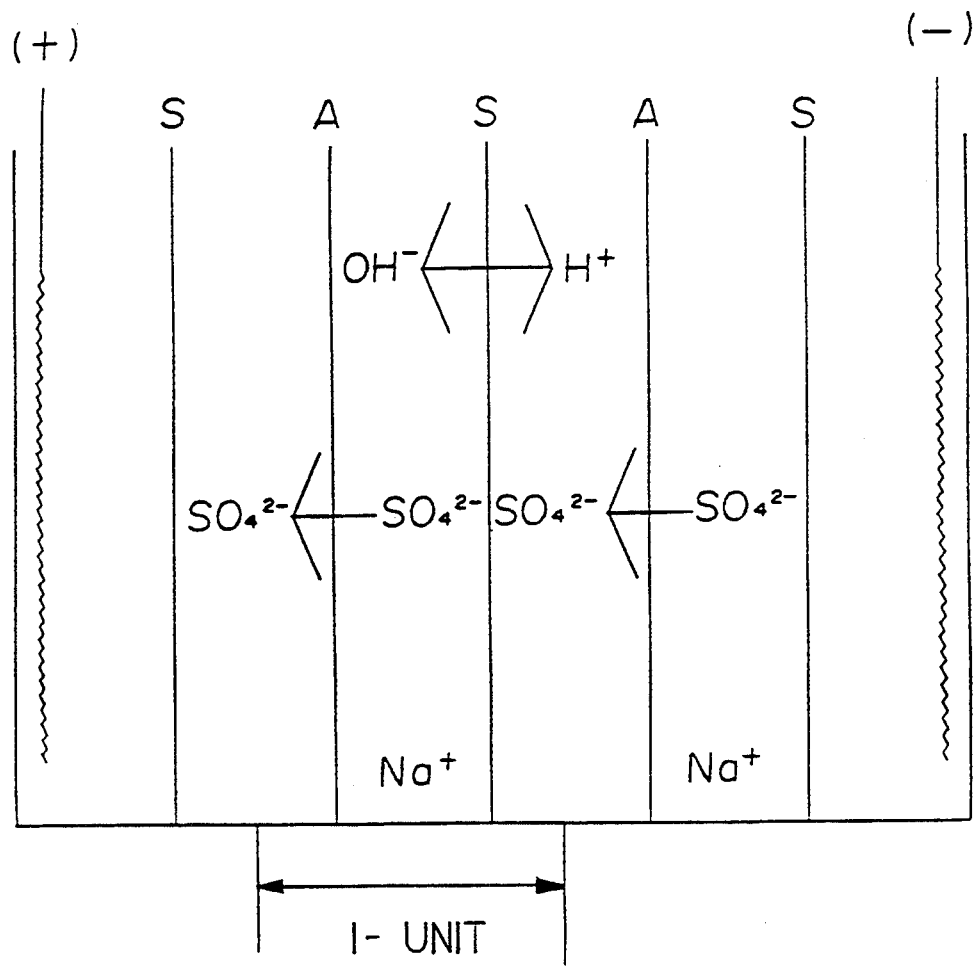
FIG. 2 is a schematic view illustrating another preferred electrodialysis cell for carrying out the method of the present invention.
Figure 3:
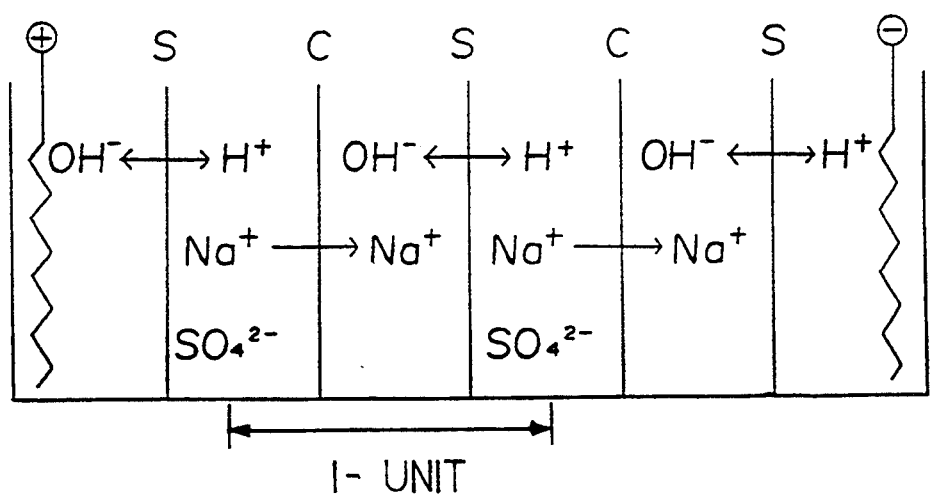
FIG. 3 is a schematic view illustrating a still further preferred electrodialysis cell for carrying out the method of the present invention.

In a case where an acid and/or an alkali metal hydroxide of a high concentration is to be produced or recovered by electrodialysis employing a bipolar membrane, an anion exchange membrane and/or a cation exchange membrane in the present invention, it is preferred to employ an electrodialysis cell as illustrated in FIG. 1, FIG. 2 or FIG. 3.

In FIG. 1, at least one unit comprising a cation exchange membrane C, a bipolar membrane S and an anion exchange membrane A arranged in this order, is disposed between an anode and a cathode. Namely, with the bipolar membrane S at the center, the cation exchange membrane C is disposed at the anode side, and the anion exchange membrane A is disposed at the cathode side, to constitute one unit. An aqueous solution containing a neutral salt as the feed material (Glauber's salt in FIG. 1) is supplied to each of the compartment partitioned at the anode side by the cation exchange membrane and at the cathode side by the anion exchange membrane, of the electrodialysis cell thus constructed, while an acid and an alkali metal hydroxide aqueous solution or water for dilution are supplied to the compartment partitioned by the bipolar membrane S and the anion exchange membrane A and the compartment partitioned by the bipolar membranes and the cation exchange membrane C, respectively. Then, an electric current is applied at a current density of from 5 to 40 A/dm$^2$, preferably from 5 to 20 A/dm$^2$, at a cell temperature of from 25° to 90° C., preferably from 25° to 65° C.

As a result, water is dissociated into hydrogen ions and hydroxide ions at the bipolar membrane S, whereupon an alkali metal hydroxide (sodium hydroxide in FIG. 1) will be formed in the compartment partitioned by the bipolar membrane S and the cation exchange membrane C, and an acid (sulfuric acid in FIG. 1) will be formed in the compartment partitioned by the bipolar membrane S and the anion exchange membrane A. FIG. 1 illustrates a case where only one unit is formed between the anode and the cathode. However, usually, from 50 to 500 units, preferably from 100 to 200 units, are assembled.

In FIG. 2, the bipolar membrane S and the anion exchange membrane A are alternately disposed between the anode and the cathode. Namely, with the bipolar membrane S at the center, the anion exchange membranes A are disposed on both sides of the bipolar membrane, to form one unit. An aqueous solution containing a neutral salt (Glauber's salt in the case of FIG. 2) is supplied to the compartment on the anode side of the bipolar membrane S of the electrodialysis cell thus constructed, while the resulting aqueous acid solution or water for dilution is supplied to the compartment on the cathode side of the bipolar membrane S, and an electric current is applied in the same manner in the case illustrated in FIG. 1.

As a result, water is splitted into hydrogen ions and hydroxyl ions at the bipolar membrane S, whereupon an acid (sulfuric acid in the case of FIG. 2) is formed on the cathode side of the bipolar membrane S, while an alkali metal hydroxide (sodium hydroxide in the case of FIG. 2) will be formed on the anode side. FIG. 2 illustrates a case where one unit is formed between the anode and the cathode. However, usually, from 50 to 500 units, preferably from 100 to 200 units, are assembled.

Further, an electrodialysis cell as illustrated in FIG. 3 is used when an alkali metal hydroxide is to be produced or recovered from an aqueous solution of a neutral salt according to the present invention.

In FIG. 3, the bipolar membrane S and the cation exchange membrane C are alternately disposed between the anode and the cathode. Namely, with the bipolar membrane S at the center, the cation .exchange membranes C are disposed at the both side of the bipolar membrane, to form one unit. The neutral salt (Glauber's salt in the case of FIG. 3) is supplied to each of the compartment on the cathode side of the bipolar membrane S and on the anode side of the cation exchange membrane, while an alkali metal hydroxide aqueous solution or water for dilution is supplied to the rest of compartments, and an electric current is applied.

As a result, an alkali metal hydroxide (sodium hydroxide in FIG. 3) will be produced in the compartment on the anode side of the bipolar membrane S and on the cathode side of the cation exchange membrane. FIG. 3 illustrates a case where one unit is formed between the anode and the cathode. Usually, however, from 100 to 200 units are preferably assembled.

In the present invention, the bipolar membrane may be any bipolar membrane so long as it is composed of a cation exchange layer and an anion exchange layer and capable of splitting water at the interface of those layers upon application of an electric current. The bipolar membrane is preferably produced by intimately bonding a cation exchange membrane and an anion exchange membrane. As preferred examples, those disclosed in e.g. Japanese Examined Patent Publications No. 47235/1984 and No. 502673/1989, Japanese Unexamined Patent Publication No. 131125/1990 and International Publication No. 89/01059, may be employed.

When an acid and/or an alkali metal hydroxide are to be produced by electrodialysis employing a bipolar membrane and an anion exchange membrane and/or the cation exchange membrane, as shown in FIG. 1, 2 or 3, the current efficiency varies to a large extent depending upon the anion exchange membrane and the cation exchange membrane used. Especially when an acid is to be prepared at a high concentration, the current efficiency used to be at a level of 30% at best in many cases, and it has been impossible to obtain a high current efficiency.

Whereas, according to the present invention, it has been found that an unexpectedly high current efficiency can be attained when an anion exchange membrane made of a polymer containing repeating units of the above formula (I) and having an ion exchange capacity of from 1 to 5 meq/g dry resin, preferably from 1.5 to 3 meq/g dry resin, is used. Further, in the formula (I), each of $R_1$, $R_2$ and $R_3$ is preferably a hydrogen atom, and the hydrogen atoms on the pyridine ring may be substituted by lower alkyl groups, as the case requires.

The polymer containing the repeating units of the formula (I) may have an average molecular weight of $10^3$–$10^7$, preferably $10^4$–$10^7$. The polymer may preferably be a copolymer of 4-vinylpyridine with divinylbenzene, a copolymer of 2-vinylpyridine with divinylbenzene, or a copolymer of 2,6-dimethyl-4-vinylpyridine with divinylbenzene. To such a copolymer, a further monomer such as styrene, acrylic acid, methacrylic acid, ethylene or propylene, may be copolymerized in an amount of from 10 to 40% by weight, as the case requires. In any case, in the present invention, it is preferred that the repeating units of the formula (I) are contained in an amount of from 20 to 60% by weight, more preferably from 30 to 50% by weight, in such a copolymer. Then, by modifying the nitrogen of the pyridine heterocyclic ring of such a polymer to pyridinium by protonation with an acid such as hydrochloric acid or sulfuric acid, an anion exchange membrane will be formed.

The anion exchange membrane to be used in the present invention may be produced by various methods. Preferably, it is reinforced to improve the mechanical strength as the case requires. For this purpose, it is possible to employ a method wherein the monomer mixture constituting the above anion exchange membrane is impregnated to the film of such a polymer and graft-polymerized by radiation, and then the above-mentioned monomer mixture is copolymerized, or a method wherein monomers constituting the anion exchange membrane are impregnated to a woven fabric or non-woven fabric of such a polymer and then copolymerized.

The polymer to be used for such reinforcement may, preferably, be polyethylene, polypropylene, polyvinyl chloride, polybutylene terephthalate, polyethylene terephthalate, polyphenylene-oxide, polyphenylene sulfide, polysulfone, polyethersulfone, polytetrafluoroethylene, an ethylene-tetrafluoroethylene copolymer, a tetrafluoroethylene-perfluoropropylene copolymer, polychlorotrifluoroethylene, polyvinylidene fluoride, polyvinylidene chloride, polyvinyl acetate or polymethyl methacrylate.

The thickness of the anion exchange membrane to be used in the present invention is preferably at least 10 $\mu$m, more preferably from 50 to 200 $\mu$m. If the membrane is thin, the mechanical strength tends to be inadequate. On the other hand, if it is too thick, the electric resistance of the membrane will be large, such being undesirable.

The cation exchange membrane which may be used as the case requires together with the bipolar membrane and the anion exchange membrane in the present invention, may be any cation exchange membrane. However, it is preferred to use a membrane having a small permeability for hydroxyl ions depending upon the concentration of the alkali metal hydroxide to be produced. With this system, it is possible to produce an alkali metal hydroxide at a high concentration as well as an acid at a high concentration.

As a result of a research conducted by the present inventors, it has been found that when an alkali metal hydroxide is produced by electrodialysis employing the bipolar membrane and the cation exchange membrane, and optionally the anion exchange membrane, in the present invention, the behavior of the cation exchange membrane during the electrodialysis substantially differs in the neutral salt side and the alkali metal hydroxide side. Namely, it has been found that the performance of the cation exchange membrane for the electrodialysis is influenced largely by the concentration at the alkali metal hydroxide side rather than at the neutral salt side of such a membrane, and the membrane should have a certain specific small value of the water content in the alkali metal hydroxide aqueous solution having the same concentration as the concentration of the alkali metal hydroxide to be produced, in order to obtain an excellent electrodialysis performance i.e. a high current efficiency. It is believed that by reducing the water content of the membrane, the membrane will have a structure where cation exchange groups are locally concentrated, whereby removal of $OH^-$ will be substantial and the current efficiency thereby increases.

As the cation exchange membrane having such physical properties to be used together with the bipolar membrane in the present invention, a perfluropolymer membrane having carboxylic acid groups and containing repeating units of the formula $—CF_2—CF-\{OCF_2CF(CF_3)\}_mO(CF_2)_nCOOM—$ wherein m is 0 or 1, n is an integer of from 1 to 5, and M is M or an alkali metal, is preferred, since it is excellent also in the alkaline stability. Such a polymer membrane may, preferably, be a membrane of a copolymer of tetrafluoroethylene with a monomer capable of forming the above repeating units, which has an ion exchange capacity of from 0.5 to 1.5 meq/g dry resin. If the ion exchange capacity is less than 0.5 meq/g dry resin or more than 1.5 meq/g dry resin, the water content in the alkali metal hydroxide solution with the same concentration as the concentration of the alkali metal hydroxide to be produced, will not be within a range of from 3.0 to 8.0% by weight, whereby it is not attainable to produce the alkali metal hydroxide with a high current efficiency.

As another preferred cation exchange membrane, a membrane made of a copolymer of ethylene with acrylic acid or methacrylic acid, or a salt thereof, represented by the formula $—\{CH_2—CH_2\}_p—\{CH_2—CX(COOY)\}_q—$ wherein X is $—H$ or $—CH_3$, Y is $—H$ or an alkali metal or an alkaline earth metal, and $p/q=0.15$ to 0.20, and having an ion exchange capacity of from 1.0 to 2.0 meq/g dry resin, may be employed.

When potassium hydroxide is to be produced, it is preferred to employ a perfluoropolymer membrane having sulfonic acid groups as functional groups and containing repeating units of the formula $—CF_2—CF-\{OCF_2CF(CF_3)\}_mO(CF_2)_nSO_2M—$ wherein m, n and M are as defined above, as the cation exchange membrane. Such a polymer membrane may, preferably, be a membrane of a copolymer of tetrafluoroethylene with a monomer capable of forming such repeating units and having an ion exchange capacity of from 0.8 to 1.3 meq/g dry resin.

The cation exchange membrane to be used in the present invention, may be reinforced, as the case requires, by blending a polymer such as polyethylene, polypropylene, polytetrafluoroethylene or a copolymer of ethylene with tetrafluoroethylene at the time of film-forming. Otherwise, the membrane may be reinforced by laminating or inserting a reinforcement made of a woven fabric, non-woven fabric or film made of such a polymer.

The thickness of the cation exchange membrane to be used in the present invention, is preferably at least 5 $\mu$m, more preferably from 10 to 200 $\mu$m. If the membrane is thin, no adequate current efficiency can be obtained. On the other hand, if the membrane is too thick, the electrical resistance of the membrane will be large, such being undesirable.

In the present invention, the neutral salt as the raw material to be used for the production of an acid and/or an alkali metal hydroxide, may be any neutral salt so long as it is an electrolyte capable of being dissociated into ions in an aqueous solution and the solubility of the hydroxide of the corresponding cation or the hydrogen ion compound of the anion is good. It may, for example, be a salt of an alkali metal, a salt of an amine or an ammonium salt. The neutral salt is supplied to the electrodialysis cell in the form of an aqueous solution having a concentration of from 5 to 35% by weight, preferably from 15 to 30% by weight.

Specific embodiments of the present invention include, in addition to the production of an acid and an alkali metal hydroxide by double decomposition of a neutral salt, such as the production of sulfuric acid or hydrochloric acid as the acid and sodium hydroxide as the alkali metal hydroxide from Glauber's salt or sodium chloride, respectively, treatment of a waste solution discharged from metal pickling, treatment of a Glauber's salt waste solution produced as a by-product during flue gas desulfurization, and a recovery of an acid and an alkali metal hydroxide at high concentrations from a Glauber's salt waste solution produced as a by-product during the wet system spinning of viscose rayon.

Now, the present invention will be described in further detail with reference to Examples. However, it should be understood that the present invention is by no means restricted by such specific Examples.

EXAMPLE 1

As the anion exchange membrane, an anion exchange membrane was used which was prepared by impregnating a solution of a monomer mixture comprising 4-vinylpyridine, styrene and divinylbenzene to a woven fabric of polyvinylchloride, followed by copolymerization to obtain a membrane (ion exchange capacity: 2.2 meq/g, thickness: 120 μm) and immersing the membrane in 10 wt % hydrochloric acid at 55° C. for 18 hours to modify it to pyridinium. As the bipolar membrane, the one prepared by laminating a strong base type anion exchange membrane (Selemion "AMP", tradename, manufactured by Asahi Glass Company Ltd.) and a strong acid type cation exchange membrane (Selemion "CMV", tradename, manufactured by Asahi Glass Company Ltd.) was used. As the cation exchange membrane, a fluorine-type strong acid type cation exchange membrane (Flemion, tradename, manufactured by Asahi Glass Company Ltd.) was used.

As shown in FIG. 1, an electrodialysis cell was assembled in the order of anode compartment/anion exchange membrane/neutral salt compartment/cation exchange membrane/alkali-forming compartment/bipolar membrane/acid-forming compartment/anion exchange membrane/neutral salt compartment/cation exchange membrane/cathode compartment, so that the anion exchange membrane side of the bipolar membrane was located at the anode side and the cation exchange membrane side of the bipolar membrane was located at the cathode side. The thickness of each compartment was 1 cm.

Then, to the anode and cathode compartments and the neutral salt compartments, a 15 wt % sodium sulfate (Glauber's salt) aqueous solution was filled, to the alkali-forming compartment, a 20 wt % sodium hydroxide aqueous solution was filled, and to the acid-forming compartment, a 5–25 wt % sulfuric acid aqueous solution was filled. Electrodialysis was conducted by applying a direct current at a current density of 10 A/dm$^2$. The current efficiency to produce the acid at the concentration as identified in Table 1 in the acid-forming compartment, was calculated. The results are shown in Table 1.

TABLE 1

| Concentration of the formed acid (wt %) | Current efficiency for the acid formation (%) |
| --- | --- |
| 5 | 75 |
| 10 | 67 |
| 15 | 55 |
| 20 | 52 |
| 25 | 43 |

EXAMPLE 2

As the anion exchange membrane and the bipolar membrane, the same membranes as used in Example 1, were employed, and as shown in FIG. 2, an electrodialysis cell was assembled in the order of anode compartment/bipolar membrane/acid-forming compartment/anion exchange membrane/neutral salt compartment/bipolar membrane/acid-forming compartment/anion exchange membrane/neutral salt compartment/bipolar membrane/cathode compartment. The thickness of each compartment was 1 cm.

Then, to the anode and cathode compartments and the neutral salts compartments, a 15 wt % sodium sulfate (Glauber's salt) aqueous solution was filled, and to the acid-forming compartment, a 5–25 wt % sulfuric acid aqueous solution was filled. Electrodialysis was conducted by applying a direct current at a current density of 10 A/dm$^2$. The current efficiency to produce the acid at the concentration as identified in Table 2 in the acid-forming compartment, was calculated. The results are shown in Table 2.

TABLE 2

| Concentration of the formed acid (wt %) | Current efficiency for the acid formation (%) |
| --- | --- |
| 5 | 76 |
| 10 | 64 |
| 15 | 56 |
| 20 | 51 |
| 25 | 41 |

COMPARATIVE EXAMPLE 1

As the anion exchange membrane, an anion exchange membrane having a quaternary ammonium salt as ion exchange groups (Selemion AMV, tradename, manufactured by Asahi Glass Company Ltd.; ion exchange capacity: 2.2 meq/g dry resin, thickness: 125 μm) was used. As the bipolar membrane and the cation exchange membrane, the same membranes as used in Example 1, were employed. In the same manner as in Example 1, an electrodialysis cell was assembled in the order as shown in FIG. 1, and electrodialysis was conducted.

In the same manner as in Example 1, to the anode and cathode compartments and the neutral salt compartments, a 15 wt % sodium sulfate (Glauber's salt) aqueous solution was filled, to the alkali-forming compartment, a 20 wt % sodium hydroxide aqueous solution was filled, and to the acid-forming compartment, a 5–25 wt % sulfuric acid aqueous solution was filled, and the current density was 10 A/dm$^2$. In the same manner as in Example 1, the current efficiency to produce the acid at the concentration as identified in Table 3 in the acid-forming compartment, was calculated. The results are shown in Table 3. It is evident that the current efficiency for the acid formation is very low as compared with Example 1.

TABLE 3

| Concentration of the formed acid (wt %) | Current efficiency for the acid formation (%) |
| --- | --- |
| 5 | 35 |
| 10 | 28 |
| 15 | 23 |
| 20 | 18 |
| 25 | 12 |

EXAMPLE 3

A copolymer of $CF_2=CF_2$ with $CF_2=CFO(CF_2)_3COOCH_3$ having an ion exchange capacity of 1.25 meq/g dry resin, was formed into a film having a thickness of 50 μm. This film membrane was immersed in a 25 wt % sodium hydroxide aqueous solution and subjected to hydrolysis at 70° C. for 16 hours to obtain a carboxylic acid (Na)-type perfluoro cation exchange membrane.

On the other hand, an ethanol solution containing 10 wt % of a copolymer of $CF_2=CF_2$ with $CF_2=CFOCF_2CF(CF_3)OCF_2CF_2SO_2F$ (ion exchange capacity: 1.1 meq/g dry resin), was cast on an anion exchange membrane Selemion AMP manufactured by Asahi Glass Company Ltd. (styrene-divinylbenzene copolymer type, ion exchange capacity: 2.1 meq/g dry resin, thickness: 120 μm) and then dried at 110° C. for 30 minutes to form a cation exchange layer (thickness: 30 μm), whereby a bipolar membrane was obtained. Further, as the anion exchange membrane, Selemion AAV manufactured by Asahi Glass Company Ltd. (styrene-divinylbenzene copolymer type, ion exchange capacity: 1.8 meq/g-dry resin, thickness 115 μm) was used.

As shown in FIG. 1, an electrodialysis cell was assembled in the order of anode compartment/anion exchange membrane/neutral salt compartment/cation exchange membrane/alkali-forming compartment/bipolar membrane/acid-forming compartment/anion exchange membrane/neutral salt compartment/cation exchange membrane/cathode compartment, so that the anion exchange layer of the bipolar membrane was located at the anode side and the cation exchange layer of the bipolar membrane was located at the cathode side. The thickness of each compartment was 1 cm. Then, to the anode and cathode compartments and the neutral compartments, a 15 wt % sodium sulfate aqueous solution was filled, to the alkali-forming compartment, a 35 wt % sodium hydroxide aqueous solution was filled, and to the acid-forming compartment, a 1N sulfuric acid aqueous solution was filled. Electrodialysis was conducted by applying a direct current at a current density of 10 A/dm². The amount of the alkali metal hydroxide formed in the alkali-forming compartment was determined, and the current efficiency was calculated. The current efficiency for the alkali-formation is shown in Table 4 together with the water content of the cation exchange membrane in the 35 wt % sodium hydroxide aqueous solution.

EXAMPLE 4

Electrodialysis was conducted in the same manner as in Example 3 except that as the cation exchange membrane, a membrane of a copolymer of ethylene with acrylic acid (ion exchange capacity: 1.5 meq/g dry resin, thickness: 100 μm) was used. The results are shown in Table 4.

EXAMPLE 5

A copolymer of $CF_2=CF_2$ with $CF_2=CFOCF_2CF(CF_3)(CF_2)_2SO_2F$ having an ion exchange capacity of 0.91 meq/g dry resin, was formed into a film having a thickness of 50 μm. This film was immersed in an aqueous solution containing 11 wt % of potassium hydroxide and 30 wt % of dimethylsulfoxide at 90° C. for 1 hour for hydrolysis to obtain a sulfonic acid (K)-type perfluoro cation exchange membrane.

Using this cation exchange membrane, electrodialysis was conducted in the same manner as in Example 3 by filling a 15 wt % potassium chloride aqueous solution to the neutral salt compartments, a 35 wt % potassium hydroxide aqueous solution to the alkali-forming compartment and a 1N hydrochloric acid aqueous solution to the acid-forming compartment. The results are shown in Table 4.

COMPARATIVE EXAMPLE 2

Electrodialysis was conducted in the same manner as in Example 3 except that as the cation exchange membrane, a membrane made of a copolymer of $CF_2=CF_2$ with $CF_2=CFOCF_2CF(CF_3)OCF_2CF_2SO_2F$ having an ion exchange capacity of 0.91 meq/g dry resin and a thickness of 140 μm, was used. The results are shown in Table 4.

TABLE 4

| | Alkali-forming compartment | Water content (wt %) | Current efficiency for the alkali-formation (%) |
| --- | --- | --- | --- |
| Example 3 | 35 wt % NaOH | 4.5 | 86.0 |
| Example 4 | 35 wt % NaOH | 5.0 | 84.8 |
| Example 5 | 35 wt % KOH | 5.8 | 87.2 |
| Comparative Example 2 | 35 wt % NaOH | 9.6 | 54.3 |

EXAMPLE 6

A copolymer of $CF_2=CF_2$ with $CF_2=CFO(CF_2)_3COOCH_3$ having an ion exchange capacity of 1.25 meq/g dry resin, was formed into a film having a thickness of 50 μm. On the other hand, a copolymer of $CF_2=CF_2$ with $CF_2=CFOCF_2CF(CF_3)(CF_2)_2SO_2F$ having an ion exchange capacity of 0.91 meq/g dry resin, was formed into a film having a thickness of 20 μm. These two films were joined together by pressing at 200° C. to obtain a composite membrane. This membrane was immersed in a 25 wt % sodium hydroxide aqueous solution at 70° C. for 16 hours for hydrolysis to obtain a perfluoro cation exchange membrane.

An electrodialysis cell was assembled in the same manner as in Example 3 except that the above composite membrane was used instead of the cation exchange membrane used in Example 3, so that sulfonic acid groups of the composite membrane were located at the neutral salt compartment side, and the carboxylic acid groups of the composite membrane were located at the alkali-forming compartment side. Electrodialysis was conducted in the same manner as in Example 3 except that a 5N sulfuric acid aqueous solution was filled to the acid-forming compartment. After two hours from the initiation of electrodialysis, the pH of the neutral salt compartments was 1.4, and the voltage drop of the cation exchange membrane was 0.21 V.

COMPARATIVE EXAMPLE 3

Electrodialysis was conducted in the same manner as in Example 6 except that as the cation exchange membrane, the carboxylic acid-type perfluoro cation exchange membrane used in Example 3, was employed. After two hours from the initiation of electrodialysis, the pH of the neutral salt compartments was 1.4, and the voltage drop of the cation exchange membrane was 5.34 V.

According to the present invention, it is possible to produce an acid at a high concentration at a level of from 5 to 20 wt % from a neutral salt such as Glauber's salt at a current efficiency of at least 50% and optionally produce an alkali metal hydroxide at a high concentration at a level of more than 20 wt % with a high current efficiency more than 80%. Accordingly, it is possible to recover an acid and optionally an alkali at a high concentration from various industrial waste liquids containing neutral salts, which used to be difficult to conduct on an industrial scale for the reasons of product quality and costs. Thus, the present invention is very useful not only from the viewpoint of prevention of pollution but also from the viewpoint of effective utilization of the resources by recovery.

We claim:

1. A method for producing an acid, or an acid and an alkali metal hydroxide, from a neutral salt by electrodialysis employing a bipolar membrane, an anion exchange membrane and a cation exchange membrane, wherein the anion exchange membrane comprises a polymer having repeating units of the formula:

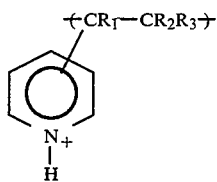

(I)

wherein each of $R_1$, $R_2$ and $R_3$ is a hydrogen atom or an alkyl group having up to two carbon atoms, and having an ion-exchange capacity of from 1 to 5 meq/g dry resin,
wherein the cation exchange membrane comprises a cation exchange membrane having a water content of from 3.0 to 8.0% by weight in an aqueous alkali metal hydroxide solution having a concentration equal to the concentration of the alkali metal hydroxide to be produced.

2. The method according to claim 1, wherein in an electrodialysis cell having the bipolar membrane and the anion exchange membrane alternately arranged between an anode and a cathode, an aqueous solution of the neutral salt is supplied to a first compartment which is partitioned at the cathode side by the bipolar membrane and at the anode side by the anion exchange membrane, and an electric current is applied to produce an acid in a second compartment which is adjacent to the first compartment and which is partitioned at the anode side by the bipolar membrane and at the cathode side by the anion exchange membrane.

3. The method according to claim 1, wherein in an electrodialysis cell having at least one unit of the cation exchange membrane, the bipolar membrane and the anion exchange membrane arranged in this order between an anode and a cathode, an aqueous solution of the neutral salt is supplied to a first compartment which is partitioned at the anode side by the anion exchange membrane and at the cathode side by the cation exchange membrane, and an electric current is applied to produce the acid in a second compartment which is partitioned at the anode side by the bipolar membrane and at the cathode side by the anion exchange membrane and to produce an alkali metal hydroxide in a third compartment which is partitioned at the anode side by the cation exchange membrane and at the cathode side by the bipolar membrane.

4. The method for producing an acid according to claim 1, wherein the anion exchange membrane comprises a copolymer of vinylpyridine and divinylbenzene, wherein the nitrogen of the pyridine heterocyclic ring is modified to pyridinium by protonation.

5. The method according to claim 1, wherein the concentration of the acid produced is within a range of from 5 to 25% by weight.

6. The method according to claim 1, wherein the cation exchange membrane is a perfluoropolymer membrane having carboxylic acid groups and an ion exchange capacity of from 0.5 to 1.5 meq/g dry resin.

7. The method according to claim 1, wherein the cation exchange membrane is a membrane comprising a copolymer of ethylene with acrylic acid or methacrylic acid, or a salt thereof, which has an ion exchange capacity of from 1.0 to 2.0 meq/g dry resin.

8. The method according to claim 1, wherein the alkali metal hydroxide is potassium hydroxide, and the cation exchange membrane is a perfluoropolymer membrane having sulfonic acid groups and an ion exchange capacity of from 0.8 to 1.3 meq/g dry resin.

9. The method according to claim 1, wherein the cation exchange membrane is a laminated membrane comprising a perfluoropolymer membrane having sulfonic acid groups and a perfluoropolymer membrane having carboxylic acid groups.

10. The method according to claim 1, wherein the cation exchange membrane is a laminated membrane comprising a perfluoropolymer membrane having sulfonic acid groups and a membrane of a copolymer of ethylene with acrylic acid or methacrylic acid, or a salt thereof.

11. The method according to claim 1, wherein the neutral salt is a sulfate of potassium or sodium, the acid is sulfuric acid, and the alkali metal hydroxide is sodium hydroxide or potassium hydroxide.

* * * * *